June 26, 1934.  H. L. TANNER  1,964,227
TELEMETRIC SYSTEM
Filed May 26, 1928
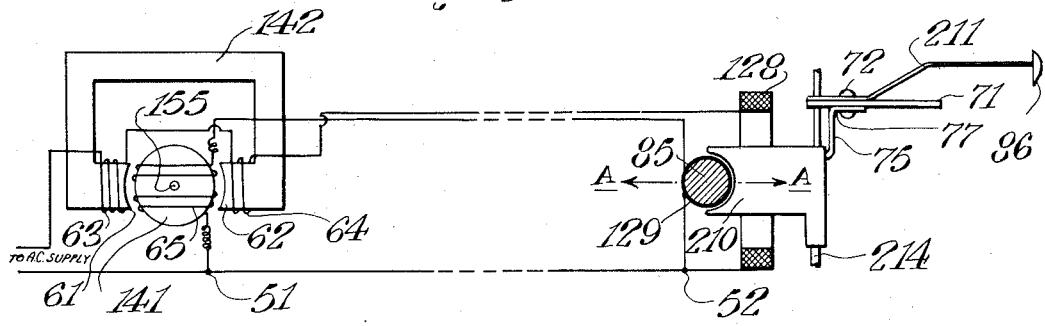
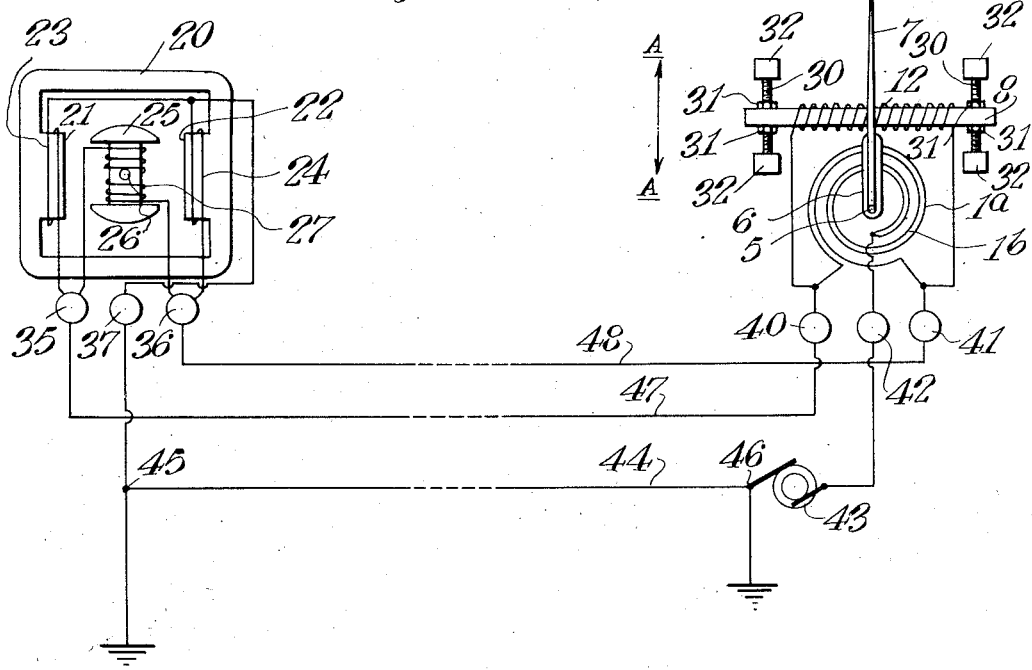
Harry L. Tanner, INVENTOR.
BY Cooper, Kerr & Dunham, ATTORNEYS.

Patented June 26, 1934

1,964,227

UNITED STATES PATENT OFFICE 1,964,227

TELEMETRIC SYSTEM

Harry L. Tanner, Brooklyn, N. Y.; The National City Bank of New York, executor of said Tanner deceased, assignor, by mesne assignments, to Wallace & Tiernan Products, Inc., Belleville, N. J., a corporation of New Jersey Application May 26, 1928, Serial No. 280,729

15 Claims. (Cl. 177—351)

This invention relates to telemetric systems and one of its principal objects is to effect certain improvements in transmitting instruments, indicating instruments, and their connections, whereby desired accuracy in indication is obtained with a relatively low number of line wires. Other objects and advantages will be apparent to those skilled in the art, to which the features of invention relate, after they have read the following disclosure of some of the various physical embodiments of the features of invention.

Fig. 1 illustrates, partly diagrammatically, a system disclosed in my copending application Serial No. 104,662, filed April 26, 1926, now Letters Patent No. 1,741,590, patented on December 31, 1929.

Fig. 2 illustrates, also partly diagrammatically, a now preferred system.

While certain features of the invention may be used to advantage, and within the scope of some of the appended claims, in direct current systems, in which case the impedance or opposition to current flow offered by the various elements is their ohmic resistance alone, these same advantages occur in alternating current systems, to which the present detailed disclosure is confined to avoid surplusage in illustration and description.

The transmitting instrument shown in the left hand portion of Fig. 1 comprises a rotor or movable element 141 and a stator 142. The rotor is shown as a cylinder mounted upon a suitably journaled shaft 155 for rotation or oscillation about its axis. The shaft 155 to which the rotor 141 is secured may be actuated through any suitable mechanism (not shown but well known) to assume various angular positions in accordance with the level of liquid in a tank or other function which it is desired to indicate at the indicating station. Mounted upon the rotor 141 is a coil or winding 65 the opposite ends of which are connected respectively to the opposite ends of the coil 129 of the indication-producing instrument. Mounted upon the poles 61 and 62, respectively, of the laminated iron or steel core of the stator 142 are coils or windings 63, 64. The coils 63 and 64 are connected in series with each other and in series with the coil 128 of the indicating instrument across an A. C. line. It will be understood that the transmitting instrument shown in the left hand part of Fig. 1 may be placed at any desired distance from, or position with respect to, the indicating instrument shown in the right hand part of Fig. 1. Preferably the drum of the rotor 141 is constructed of magnetizable material such as iron or silicon steel laminations.

The coils 63 and 64 are so relatively wound and connected that, when energized, the polarity of the poles 61 and 62 will at all times be opposite to each other. In other words, alternating magnetic flux will pass between the poles 61 and 62. When the rotor coil 65 is in a neutral position, i. e. in such position that this flux does not pass through the said coil 65, no E. M. F. will be induced in the latter. When the rotor is shifted so that the rotor coil 65 is shifted in one direction or the other from its neutral position an E. M. F. will be induced in the said coil 65, and current will flow through the coils 65 and 129. The instantaneous direction of the current flow through the coil 129 with respect to the current flowing through the coil 128 will depend upon which direction the rotor 141 and its coil 65 have been shifted from the neutral position. The magnitude or strength of the current flowing through the coil 129 will depend upon the extent to which the rotor 141 and its coil 65 have been moved from neutral position.

The indicating instrument shown in the right hand portion of Fig. 1 is one that is comparatively simple and easy to construct and which has a considerable index-operating torque. In this form of instrument the shaft 214, mounted in suitable journals (not shown), has secured thereto an armature 210 and a pointer or index 211. The latter may cooperate with a scale, as will hereinafter appear, or may be provided with a stylus or inking pen 86 adapted to trace a record upon a record sheet (not shown). The armature 210 and arm 75 may conveniently be constructed from a single piece of sheet iron or other magnetizable material. It will be noted that the shaft 214 not only passes through the armature 210 but also through the rear end of the index or pointer 211 and also through the rear end of a member 71 of sheet material used as a counterweight. The index or pointer, 211, the counterweight 71, and the armature 210 are secured together by a rivet 72. The counterweight is so adjusted that the center of gravity of the shaft 214 and the elements secured thereto lies on the axis of the said shaft 214.

A stationary cylindrical rod 85 of iron or other magnetizable material, shown in cross-section in Fig. 1, is mounted at right angles to the axis of the coil 128. The coil 128 and the cylinder or rod 85 are so placed that the armature when in mid or neutral position extends at right angles to the axis of the cylinder 85 and parallel to the axis of the coil 128. The coil 129 is wound on the cylinder 85 and when energized magnetizes the cylinder 85, the relative polarity depending upon the direction of flow of current through the coil 129 with respect to that flowing through the coil 128, and the strength of magnetization depending upon the magnitude of the current flowing through the coil 129. When current flows through the coil 128, it causes magnetic flux to pass through the armature 210 and into the cylinder 85, or vice versa. When no current is flowing through the coil 129 and current is flowing through the coil 128, the armature 210 will assume a position at right angles to the axis of the cylinder 85 because in that position the air gap between the armature 210 and the cylinder 85 is shortest. In other words, the cylinder 85 acts as a centralizing device for the armature. If the coil 129 is now energized, the armature 210 will automatically be shifted to a new position of equilibrium to one side or the other of its neutral position depending upon the direction of flow of current in the coil 129 with respect to the direction of flow of current in the coil 128. Furthermore, when current is caused to flow through the coil 129, the extent of deflection of the armature 210 from neutral position will depend upon the strength or magnitude of the current through the coil 129.

The principle of operation of the indicating instrument shown in Fig. 1 is generally the same as that of the instrument shown in Figs. 1 and 2 of my United States Letters Patent No. 1,587,050, patent June 1, 1926, and claims covering the indicating instrument shown in Fig. 1 of the present application will be found in my said patent.

In view of the foregoing disclosure it will be appreciated that the index 211 will indicate or record the position of the rotor 141 or any device connected thereto. The number of line wires required is small. If the circuit connecting the coil 65 to the coil 129 is made entirely independent of the circuit of the coils 63, 64, 128, and metallic circuits are employed throughout, the total number of line wires is only four. This number may be, and preferably is, reduced by employing a transmission path, such as that connecting the points 51, 52, common to the two circuits 65—129 and 128—63—64. In this case the total number of line wires is only three even when metallic circuits are employed throughout.

While the system shown in Fig. 1, employing only two line wires in addition to the common path, is operative and satisfactory in many cases, nevertheless it has certain limitations which I have overcome. I shall first speak of these limitations and later describe the means for overcoming them.

It is of course highly desirable to standardize the transmitting instruments and the indicating instruments so that the same stock instruments may be employed for lines of different length (depending upon the distances between the transmitting and indicating stations). For lines of relatively short length or low resistance and for certain classes of service, the line drop of potential may be inappreciable and/or unobjectionable. However, on long lines and especially where comparatively great fidelity and accuracy in indication are desired, the line drop is objectionable. Thus, still referring to Fig. 1 and assuming that the coils 65 and 129 and the line wire forming a part of only this circuit were absent, there is a drop in potential between the points 51 and 52 due to the current flowing in the following circuit: from A. C. supply—coil 63—coil 64—upper line wire—coil 128—path 52, 51—A. C. supply. With the coils 65 and 129 connected as shown and with the coil 65 in its neutral position, i. e., in which no E. M. F. is induced in the coil 65 by the flux passing between the poles 61—62, there would be current flowing through the coils 65 and 129 due to the above described difference in potential between the point 51 (due to line drop produced by the current in the circuit 63—64—128—52—51) when no current should be flowing through the coils 65 and 129. Likewise and due to the same cause the current flowing through the coils 65 and 129 in other positions of the rotor coil 65 would not be exactly what it should be. Similarly the current flowing in the circuit 63—64—128—52—51 is affected by the current which is caused to flow in the circuit 65—129—52—51 by the E. M. F. induced in the coil 65 by the flux passing between the poles 61—62. Furthermore, the strength of the centralizing force acting upon the armature 210 and which depends upon the strength of current through the coil 128 may be too great or too small in certain cases. I now provide means for overcoming these limitations and/or objections while retaining the desirable features of the system above disclosed. Among other means I now prefer to employ those embodied in Fig. 2 which I shall proceed to describe.

The transmitting instrument is shown at the left and the indicating instrument at the right. The transmitting instrument has a stator 20 provided with poles 21, 22, and windings 23, 24, corresponding to the stator 142, poles 61, 62, and windings 63, 64 of the transmitter shown in Fig. 1 and above described. The transmitting instrument has also a rotor or armature 25 mounted on a shaft 26 and carrying a coil 27, corresponding to the rotor 141, shaft 155, and coil 65, respectively of the transmitting instrument shown in Fig. 1 and described above. The electrical connections of the transmitting instrument shown in Fig. 2 differ however from those shown in Fig. 1 as will later be pointed out.

The indicating instrument shown in Fig. 2 is, in many respects, the same as that shown in Figs. 1 and 2 of my said Patent No. 1,587,050, the coil 1a, 1b, corresponding to the coil 1 in the patented instrument, the elements 5, 6, 7, and 16, corresponding to the similarly designated elements in the patented arrangement, and the coil 12 corresponding to the coil 12, 13 in the patented arrangement. Several differences are, however, to be noted. In the patented arrangement (i. e. Figs. 1 and 2 of the patent) the deflecting coil, wound upon the centralizing bar, is shown and described as "a coil of wire preferably in the form of a plurality of opposed windings 12, 13". In short, in the instrument shown in Figs. 1 and 2 of the patent, the deflecting coil is a two-winding coil. In the present (Fig. 2) indicating instrument the deflecting coil 12 is a single winding coil. Also in the instrument shown in Figs. 1 and 2 of the patent the magnetizing coil 1 is a single winding coil whereas in the present (Fig. 2) indicating instrument the magnetizing coil is a two-winding coil 1a, 1b. The last mentioned coil may be, and preferably is constructed by winding two wires together on the same spool in the same direction to form the two windings 1a, 1b, and, as shown, these two windings are directly electrically connected together at one end which may be either the starting or finishing end of the windings. I shall now describe another feature embodied in the indicating instrument shown in Fig. 2 and not embodied in the instrument shown in Figs. 1 and 2 of the patent.

The magnetic centralizing bar 8 is mounted so as to be adjustable toward and away from the vane or armature 6 and means are provided whereby the adjustment may be made and held. One form of such means is illustrated and may be constructed as follows. The bar 8 is supported by threaded rods 30 which pass through the bar with suitable clearance and to which the bar is secured in various positions of adjustment along the rods by the clamping nuts 31, 31, provided on the rods. The rods 30 are secured to suitable standards or brackets 32, 32, so as to be non-rotatable and otherwise immovable. By virtue of the provision of such means the bar (8 in Fig. 2 or 85 in Fig. 1) may be adjusted in the direction A—A, i. e. toward or away from the movable armature or vane (6 in Fig. 2 or 210 in Fig. 1), and clamped in any desired position of adjustment. The magnetic centralizing force acting upon the movable vane or armature depends upon the magneto-motive force set up by the magnetizing coil (1a, 1b in Fig. 2 or 128 in Fig. 1), which depends upon the current flowing through the said coil, and also upon the reluctance of the magnetic path, which includes the air gap between the centralizing bar and the vane or armature. By virtue of the adjusting means, such as that above described, a stock instrument may be adjusted to read accurately in various installations having different electrical constants. Other things being the same, the effect of the adjustment is to spread or contract the scale reading to either side of central position.

The now preferred form of electrical connections are shown in Fig. 2. In the transmitting instrument the movable armature or rotor coil 27 is connected across the terminals 35 and 36, the leads being sufficiently flexible to permit the desired movement of the armature or rotor. One end of each of the transmitter stator or field windings 23, 24, is connected to a corresponding one of the terminals 35, 36, and the other ends of the said windings 23 and 24 are connected together and to the terminal 37 of the transmitting instrument. In the indicating instrument the deflecting coil 12 is connected across the terminals 40, 41, sufficient flexibility in the leads being provided to permit of the desired range of adjustment of the centralizing bar 8. One winding 1a of the magnetizing coil is connected at one end to the terminal 40, the other winding 1b of the magnetizing coil is connected at one end to the terminal 41, and the other ends of both windings 1a and 1b are connected together and to the terminal 42. While the source of E. M. F., diagrammatically illustrated as an A. C. generator 43, may be connected in other places along the line 44 between the terminals 37—42. I have shown it at or near the indicating instrument. If earth or ground conduction is permissible and desirable the metallic or wire line connection 44 may be dispensed with between the points 45 and 46. The terminal 35 is connected to the terminal 40 by a line wire 47 and the terminals 36 and 41 are connected by a line wire 48. The impedance of the windings 1a, 1b is high as compared to that of the deflecting coil 12. The impedance of the windings 23, 24 is also comparatively high. It will be understood further that the windings 23 and 24 are so wound and connected that they aid each other in causing magnetic flux to flow from one of the poles 21, 22, to the other.

The operation of the system shown in Fig. 2 is substantially as follows: Assuming that the rotor coil 27 of the transmitter is in mid or neutral position, i. e. no E. M. F. is induced therein by the alternating magnetic flux set up by the field or stator, there will be no current flowing through coils 27 and 12. The two current paths 43—42—1a—40—47—35—23—37—45—44—46 and 43—42—1b—41—48—36—24—37—45—44—46 are symmetrical with respect to impedances so that when there is no E. M. F. induced in the rotor coil 27 by its stator field, the points 35 and 36 are at the same potential and the points 40 and 41 are at the same potential. In short, the line drop produced by the magnetizing or conduction current is substantially neutralized so far as producing disturbing effects upon the induction circuit 27—35—47—40—12—41—48—36 is concerned. When the rotor coil 27 occupies a position to one side or the other of its mid or neutral position, an E. M. F. is induced in it causing current to flow through the circuit 27—35—47—40—12—41—48—36 in one relative direction or the other and of magnitude depending upon the deflection of the rotor coil from mid position. The line drop produced by this current is substantially neutralized so far as producing disturbing effects upon the magnetizing circuit is concerned. Thus while the line drop produced by the flow of induction current increases the current flowing in one of the two branches 43—42—1a—40—47—35—23—37—45—44—46 and 43—42—1b—41—48—36—24—37—45—44—46, it simultaneously and substantially equally decreases the current flowing in the other of the last mentioned two branches.

By virtue of these various provisions, including the adjustability of the centralizing bar 8, identical or stock transmitting and indicating instruments may be employed in different installations having different line lengths, etc., with great faithfulness and accuracy in indication at 7—16 of the position of the rotor 25 at the transmitter, even when the length of line is comparatively great.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is:

1. In a telemetric system, an indicating instrument comprising in combination, a magnetizing coil, a deflecting coil, one of said coils including a plurality of cumulative windings, a plurality of line terminals, one of said coils being connected across two of said terminals, and the cumulative windings of the other coil being separately connected at one end to a corresponding one of said two last mentioned terminals and jointly connected at their other ends to a third terminal, said coils being thereby adapted to provide electromagnetically-controlled operation of an indicating device without indication-disturbing effects being produced, on current flowing cumulatively through the cumulative windings, by voltage applied across the two first-mentioned terminals.

2. A telemetric system comprising in combination, a plurality of lines having a common path, a transmitting instrument controlling the flow of currents through said lines, and an indicating instrument having means for effecting electromagnetically-controlled operation of an indicating device under control of said flow of currents, said means including a deflecting coil and a magnetizing coil connected to said lines, one of said coils being connected across two of the lines and the other of said coils having a plurality of cumulative windings one of which windings is connected across one of said lines and the common path and another one of which windings is connected across another of said lines and the common path.

3. A telemetric system comprising in combination, a main line circuit having two parallel branches, an indicating instrument having an electromagnetically-controllable indicating device and a plurality of indication-controlling coils for the said device, one of said coils being connected across the branches of said main line circuit and another of said coils having a plurality of cumulative windings one of which is connected in one of the branch circuits and another in the other of the branch circuits, whereby line drop in said main line circuit due to current flowing in either of said coils will not produce disturbing effects on the indication-controlling operation of the other of said coils.

4. An alternating current telemetric system comprising in combination, a transmitting instrument having a primary including two windings and a relatively movable secondary winding inductively associated with said primary, an indicating instrument having means for effecting electromagnetically-controlled operation of an indicating device in accordance with control by said transmitting instrument, said means including a magnetizing coil including two windings and a deflecting coil, and a main energizing line circuit having two parallel branches, one of said primary and magnetizing windings being connected in one of said branches and the other of said primary and magnetizing windings connected in the other of said branches, the secondary winding being connected across said branches at the transmitting station and the deflecting coil being connected across said branches at the indicating station.

5. An electrical indicating instrument comprising a magnetizable rotatable member, a coil for magnetizing said member and including a plurality of cumulative windings, magnetic centralizing means for said member adapted to localize the magnetic flux produced by said coil, a single winding single coil for deflecting the said member in either direction from its normal position, and electrical connections intermediate said coils for providing cumulative energization of said cumulative windings with magnetizing current and opposing energization of said cumulative windings with current which is directed to said last-mentioned single coil for deflection-controlling energization thereof.

6. An electrical indicating instrument comprising a magnetizable member, a coil member including a plurality of cumulative windings for magnetizing said magnetizable member, one of said members being rotatable, magnetic centralizing means for said movable member and located in the flux path of said coil member, a single winding single coil for deflecting said movable member in either direction from its normal position, and electrical connections intermediate said coils for providing cumulative energization of said cumulative windings with magnetizing current and opposing energization of said cumulative windings with current which is directed to said last-mentioned single coil for deflection-controlling energization thereof.

7. An electrical indicating instrument adapted for control and energization by an alternating current transmitter comprising in combination, an armature mounted for oscillation about an axis, a polarizing coil for said armature and including a plurality of cumulative windings, magnetizable means including a stationary bar of magnetizable material for centralizing and deflecting said armature in opposite directions, a single winding single coil wound on said bar for creating the magneto-motive force that causes deflection of the armature, and electrical connections intermediate said coils for providing cumulative energization of said cumulative windings with polarizing current and opposing energization of said cumulative windings with current which is directed to said last-mentioned single coil for deflection-controlling energization thereof.

8. In a telemetric system, an indicating instrument comprising in combination, a magnetizable rotatable member, a coil for magnetizing said member, magnetic centralizing means for said member adapted to localize the magnetic flux produced by said coil, a coil for deflecting the said member in either direction from its normal position, one of said coils including a plurality of cumulative windings, a plurality of line terminals, one of said coils being connected across two of said terminals, and the cumulative windings of the other coil being separately connected at one end to a corresponding one of said two last mentioned terminals and jointly connected at their other ends to a third terminal.

9. A telemetric system comprising in combination, a plurality of lines having a common path, a transmitting instrument controlling the flow of currents through said lines, an indicating instrument having a magnetizable rotatable member, a coil for magnetizing said member, magnetic centralizing means for said member adapted to localize the magnetic flux produced by said coil, and a coil for deflecting the said member in either direction from its normal position, the said indicating instrument having its deflecting coil and its magnetizing coil connected to said lines, one of said coils being connected across two of the lines and the other of said coils having a plurality of cumulative windings one of which windings is connected across one of said lines and the common path and another one of which windings is connected across another of said lines and the common path.

10. A telemetric system comprising in combination, a main line circuit having two parallel branches, an indicating instrument having a plurality of indication-controlling coils, one of said coils being connected across the branches of said main line circuit and another of said coils having a plurality of cumulative windings one of which is connected in one of the branch circuits and another in the other of the branch circuits, the said indicating instrument having a rotatable member of magnetizable material which is magnetized by the second-mentioned of said coils, magnetic centralizing means for said member adapted to localize the magnetic flux produced by said last mentioned coil, and the first-mentioned of said coils constituting a deflecting coil.

11. An alternating current telemetric system comprising in combination, a transmitting instrument having a primary including two windings and a relatively movable secondary winding inductively associated with said primary, an indicating instrument having a magnetizing coil including two windings and a deflecting coil, and a main energizing line circuit having two parallel branches, one of said primary and magnetizing windings being connected in one of said branches and the other of said primary and magnetizing windings connected in the other of said branches, the secondary winding being connected across said branches at the transmitting station and the deflecting coil being connected across said branches at the indicating station, the said indicating instrument having a rotatable member of magnetizable material which is magnetized by the coil which includes two windings, and magnetic centralizing means for said member adapted to localize the magnetic flux produced by said last mentioned coil.

12. In a telemetric system, an indicating instrument comprising, in combination, means for effecting electromagnetically-controlled operation of an indicating device and having a magnetizing coil and a deflecting coil, said magnetizing coil including a plurality of cumulative windings, a plurality of line terminals, said deflecting coil being connected across two of said terminals, and the cumulative windings of the magnetizing coil being separately connected at one end to a corresponding one of said last two mentioned terminals, and jointly connected at their other ends to a third terminal.

13. An electrical indicating instrument comprising a magnetizable rotatable member, a coil for magnetizing said member and including a plurality of cumulative windings connected to receive energizing current in parallel, magnetic centralizing means for said member adapted to localize the magnetic flux produced by said coil, and a single winding single coil for deflecting the said member in either direction from its normal position, said cumulative windings being connected in series with each other across the terminals of said last-mentioned single coil, whereby line connections to said instrument may be less than the total number of coil terminals.

14. In a telemetric system, an indicating instrument comprising in combination an electromagnetically-controllable indicating device, a plurality of indication-controlling coils for the said device, one of said coils including a plurality of cumulative windings, and electrical connections intermediate said coils for admitting energizing current thereto from a plurality of circuits and for providing cumulative energization of said cumulative windings of one coil with current from one of said circuits, and opposing energization of said cumulative windings with current from another of said circuits, while energization of another of said coils is effected with current from said last mentioned circuit.

15. An electrical indicating instrument comprising a magnetizable member, a coil member for magnetizing said magnetizable member, one of said members being rotatable, magnetic centralizing means for said movable member and located in the flux path of said coil member, a second coil member for effecting deflections of said movable member, one of said coil members including a plurality of cumulative windings, and electrical connections intermediate said coil members for admitting energizing current thereto from a plurality of circuits and for providing cumulative energization of said cumulative windings of one coil member with current from one of said circuits, and opposing energization of said cumulative windings with current from another of said circuits, while energization of the other of said coils is effected with current from said last mentioned circuit.

HARRY L. TANNER.